United States Patent
Heuser et al.

(10) Patent No.: US 6,761,828 B2
(45) Date of Patent: Jul. 13, 2004

(54) PROCESS FOR THE REDUCTION OF CONCENTRATION OF NITRATES AND/OR NITROGEN-CONTAINING COMPOUNDS BY MEANS OF $SO_2$

(75) Inventors: Jürgen Heuser, Krefeld (DE); Werner Verhoeven, Kalmthout (BE); Domien Sluyts, Hoevenen (BE); Gabriel Denecker, Kalmthout (BE)

(73) Assignee: Bayer Aktiengesellschaft, Leverkusen (DE)

( * ) Notice: Subject to any disclaimer, the term of this patent is extended or adjusted under 35 U.S.C. 154(b) by 240 days.

(21) Appl. No.: 10/096,558

(22) Filed: Mar. 13, 2002

(65) Prior Publication Data

US 2002/0131924 A1 Sep. 19, 2002

(30) Foreign Application Priority Data

Mar. 16, 2001 (DE) .......................................... 101 13 113

(51) Int. Cl.$^7$ ................................................. C02F 1/68
(52) U.S. Cl. ....................... 210/749; 210/758; 210/766; 210/903; 423/395
(58) Field of Search ............................... 210/749, 757, 210/758, 766, 903, 908; 423/395, 351, 545

(56) References Cited

U.S. PATENT DOCUMENTS

| 4,072,678 | A | * | 2/1978 | Oyama et al. | ............... | 540/535 |
| 4,091,074 | A | | 5/1978 | Gorai et al. | ................. | 423/235 |
| 4,340,489 | A | * | 7/1982 | Adams et al. | .............. | 210/718 |
| 5,015,456 | A | | 5/1991 | Verbueken et al. | ......... | 423/395 |
| 5,641,413 | A | * | 6/1997 | Momont et al. | ............ | 210/761 |
| 5,676,845 | A | | 10/1997 | Derleth et al. | ............... | 210/757 |
| 5,736,118 | A | | 4/1998 | Derleth et al. | .............. | 423/659 |
| 6,379,562 | B1 | * | 4/2002 | Burdeniuc | ................... | 210/761 |

FOREIGN PATENT DOCUMENTS

GB 1181703 2/1970

OTHER PUBLICATIONS

Ullmann's Encyclopedia of Industrial Chemistry 5$^{th}$ edition, vol. A 17: (month unavailable) 1991, pp. 324–325, Nitric Acid, Nitrous Acid, and Nitrogen Oxides.

* cited by examiner

Primary Examiner—Frank M. Lawrence
(74) Attorney, Agent, or Firm—Joseph C. Gil; Lyndanne M. Whalen

(57) ABSTRACT

Nitrate-containing (contaminated) solutions are reduced with $SO_2$ gas in the presence of an at least equimolar amount of $NH_4^+$ or ammonium salt.

9 Claims, No Drawings

PROCESS FOR THE REDUCTION OF CONCENTRATION OF NITRATES AND/OR NITROGEN-CONTAINING COMPOUNDS BY MEANS OF $SO_2$

BACKGROUND OF THE INVENTION

The present invention relates to a process in which solutions containing nitrate(s) and/or other nitrogen-containing compounds (contaminated solutions) are treated with $SO_2$ gas in the presence of an at least equimolar amount of $NH_4^+$ or an ammonium salt.

Nitrates such as ammonium nitrate are fertilizers which are used in agriculture. Nitrates are also formed in chemical processes. Nitrates, in some cases, pass into rivers where they cause over-fertilization. For that reason, the introduction of nitrate-containing wastewater is prohibited. Nitrates that form in chemical plants in various processes, for example in nitrations or in the preparation of hydroxylamines according to Raschig, are usually converted into nitrogen by denitrification in biological purification plants by an appropriate procedure. For the reduction of the nitrate oxygen, however, it is necessary to add organic substances. The consequence of the biological activity is, however, a growth in the activated sludge, which must be removed with thickeners, centrifuges, flocculating agents and driers. The destruction of nitrate in that manner is not only expensive but also frequently difficult to manage, because small amounts of toxins can destroy biological activity. In addition, relatively small variations in the amount of nitrate are problematical for complete conversion.

Other methods for removing nitrates are, for example, distillation and extraction (Ullmann's Encyclopedia of Industrial Chemistry (1991) A 17 page 324–325; EP-A 0 396 790). In that case, although it is possible to remove the nitrate from a particular production stream, contaminated by-products form as an extraction residue (in the case of extraction) or as a distillation residue (in the case of distillation) and must in turn be treated in a complex operation.

SUMMARY OF THE INVENTION

It is an object of the present invention to provide an alternative, technically simple process that allows nitrates and also organic and inorganic nitrogen compounds to be removed as completely as possible, preferably totally.

This and other objects which will be apparent to those skilled in the art is achieved by a process that converts nitrates to nitrogen by chemical means, specifically, by treatment of the water with $SO_2$ gas in the presence of sulfuric acid and an at least equimolar amount of ammonium or an ammonium salt at a temperature above 65° C. but below boiling. For example, in the case of caprolactam plants which use hydroxylamine according to the Raschig process as the raw material, treatment in accordance with the process of the present invention prevents formation of nitrate-containing waste water because the ammonium sulfate solution which remains can be processed to produce fertilizers.

DETAILED DESCRIPTION OF THE INVENTION

The present invention provides a process, preferably a continuous process, in which solutions that contain nitrates and/or organic and/or inorganic nitrogen compounds entering a reactor are reacted, preferably completely (to a residual content of <10 ppm), in the presence of sulfuric acid, with $SO_2$ gas in the presence of at least equimolar amounts of ammonium ion or an $NH_4$ salt. During this reaction, the temperature is maintained above 65° C., preferably above 70° C., and below the boiling temperature. The concentration of sulfuric acid (based on $H_2O$) in the resulting reactor mixture will typically be in the range of from 40 to 75 wt. %, preferably from 55 to 70 wt. %.

It has long been known from the literature (e.g., lead chamber process disclosed in Gmelins Handbuch, Vol. 9, p. 426) that $SO_2$ can be reacted to form sulfuric acid in the gas phase with nitrogen oxides. Ullmanns Encyclopädie, Vol. A25, p. 676 ff describes, for example, a process in which $SO_2$ is oxidized in the gas phase to $H_2SO_4$ with the aid of nitrous gases in the preparation of $H_2SO_4$.

In accordance with the present invention, however, a complete reduction of $NO_3^-$ and other nitrogen compounds by oxidation of $SO_2$ is carried out in solution under the conditions required for the process of the present invention.

In the process of the present invention, an ammonium salt, preferably ammonium sulfate, is preferably added to a reactor in which a nitrate-containing solution that contains preferably from 0.1 to 20 wt. % nitrate, most preferably from 2 to 15 wt. % nitrate is present. The ammonium salt is added in an amount that is equal to or greater than the amount of nitrate, preferably from 1.5 to 2 times greater.

That incoming solution is acidified with an acid, preferably sulfuric acid, so that the acid concentration, based on the water content of the reactor solution, is from 40 to 75 wt. %, preferably from 55 to 70 wt. %.

The temperature of the solution being treated is brought to at least 65° C., preferably >70° C.

A stream of $SO_2$, preferably in finely divided form, is metered into the reactor, preferably through the base. The stream of $SO_2$ preferably contains from 1 to 100 wt. %, most preferably from 5 to 20 wt. %, $SO_2$. The reactor mixture from which nitrate has been substantially completely converted is pumped away from the base of the reactor batchwise or continuously.

In order to ensure good contact and a good $SO_2$ gas yield, a column, preferably a trickling column, with packing material is preferably mounted on the reactor. By pumping the contents of the reactor through the column, the gases that escape can be kept in contact with the liquid for a longer time.

A heat exchanger and an acid-metering device can preferably be incorporated in the pumping circuit in order to control the reaction in the optimum manner.

The present invention also provides purified waste water and ammonium sulfate formed during the treatment process of the present invention.

EXAMPLES

Example 1

In the combustion of ammonia to produce ammonium nitrite, small amounts of nitric acid were formed as condensate. That acid was neutralized with ammonia so that a 15% ammonium nitrate solution was formed. An amount of ammonium sulfate was added to that stream of solution so that a solution of 15% ammonium nitrate and 35% ammonium sulfate was formed. 91.5 g of concentrated sulfuric acid were added to 200 g of that solution. The temperature was adjusted to 85° C. 100% $SO_2$ gas was then blown through the solution being treated. Nitrous gases formed first and the temperature rose to 98° C. After 1 hour and 10 minutes, the solution contained only 0.23 wt. % nitrate.

Comparison Example 2

To a solution corresponding to that used in Example 1, only 36 g of concentrated sulfuric acid were added instead of 91.5 g. The temperature was increased to 85° C. and $SO_2$ was blown through. This did not lead to nitrate decomposition. No nitrous gases formed and no temperature increase occurred.

Comparison Example 3

Comparison Example 2 was repeated with the exception that the temperature was adjusted to 55° C. instead of 85° C. After one hour, the nitrate content was unchanged.

In a preferred embodiment of the present invention, the reduction reaction is allowed to take place in a preliminary reactor. The effects of interfering substances, which have an adverse effect on the reaction speed (cause boiling surges, oscillating reactions occur, reactions are inhibited), can thus be avoided since the substances that interfere with the reaction (e.g., sulfamic acid, carbamic acid, urea, etc.) react to completion in the upper column by means of nitrous gases.

The nitrous gases formed in the reaction can be removed from the waste gas by conventional methods, for example by washing.

In another preferred embodiment of this invention, a preliminary reactor is mounted on the actual reactor, which may be of any desired construction. Sulfamic acid and/or carbamates and/or urea are added to the acidified solution to be purified in an amount such that the reactor mixture contains from 0.01 to 5 wt. %, preferably from 0.01 to 3 wt. %, sulfamic acid and/or carbamic acid and/or urea in total. The nitrous gases are then eliminated quantitatively. The added substances are reacted away completely in the lower region.

As used herein, sulfamic acid includes sulfamic acid and its salts and its amides. Carbamic acid includes carbamic acid, its salts and its amides.

In another embodiment of the process of the present invention, the reactor waste gases are brought into contact in a preliminary reactor counter currently with the incoming solution, and sulfamic acid, carbamate or urea is added to the incoming solution in an amount such that the reactor mixture contains from 0.01 to 5 wt. % of sulfamic acid, carbamate and/or urea in total.

The reactor and the preliminary reactor may be of any desired construction and may be reactors that are conventionally employed, such as, for example, stirrer vessels, columns, pump circulation reactors. A pump circulation reactor with a column mounted thereon is preferred. The column is preferably a packed column. The packing may be either packing material or structured packing.

The use of a preliminary reactor has the further advantage that the reduction in the actual reactor proceeds in a substantially more uniform manner. Accordingly, all substances that react with the nitrite that forms are eliminated beforehand. Amines, azides, amides, hydroxylamine, hydrazine, carbamates, urea, and sulfamic acid may occur in nitrate-containing waste streams. The double column embodiment of the invention is expedient for all those substances in order to ensure a readily controllable, continuous reaction.

Example 4

In a continuous apparatus, 3000 g/h of a saturated ammonium sulfate solution at 90° C. containing 9.04% nitrate, 2.7% sulfamic acid and 146 mg/l TOC (total organic carbon) were introduced. 600 g of sulfuric acid were metered in beforehand. That mixture was first introduced into the preliminary reactor, which in this example is a trickling column. The column (preliminary reactor) was constructed so that the liquid would preferably be pumped in and a partial stream was fed to the actual reactor, which was made up of a container with a column, preferably a trickling column, mounted thereon.

After passing through the two trickling columns, the nitrous gases reacted to completion. The sulfamic acid at the beginning of the second column was reduced to 1.6 wt. %. A further 898 g of 96% sulfuric acid per hour were metered into the reactor. The reactor temperature was 100° C. A 17% $SO_2$ gas was dispersed finely in the solution in the reactor below the liquid level by means of frits. The reduction began immediately, and brown nitrous gases and nitrogen that had formed from the ammonium nitrite cleavage passed through the above-mentioned columns. The amount of $SO_2$ added was 271 g/h. The excess $SO_2$ was converted into ammonium bisulfite in a gas washer. That product could be recycled as a valuable substance. The reaction solution was pumped out of the reactor and neutralized with ammonia water. The solution could be concentrated by evaporation and used for the preparation of ammonium sulfate. The purified solution contained 0.5% nitrate, <30 ppm sulfamic acid and 93 mg/l TOC (total organic carbon).

Comparison Example 5

The same test as described above in Comparative Example 4 was carried out with only one column. The ammonium sulfate solution contained 10.6% nitrate, 2.15% sulfamic acid and 245 mg/l TOC. No reaction occurred. When $SO_2$ had been blown in for one hour, the reaction began very vigorously and pushed some of the liquid present into the column. After a few minutes, the reaction speed fell and then increased vigorously. This oscillating movement was prevented in the preferred embodiment of the invention in which a preliminary reactor was used with the reactor.

The advantages of the process of the present invention include:
1. Removal of various nitrogen compounds as well as nitrites, hydroxylamine and organic and inorganic N compounds.
2. Reaction conditions under which organic and inorganic nitrogen compounds are destroyed simultaneously. Other organic impurities do not have an adverse effect on the reaction. The highly oxidative medium leads to the formation of nitrogen oxides, which contribute towards destroying the inhibiting components.
3. The purified solution can be neutralized with ammonia to form ammonium sulfate which can be used as a fertilizer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for treating a solution containing nitrates and/or organic or inorganic nitrogen compounds comprising reacting
   a) the solution to be treated with
   b) $SO_2$ gas
   in the presence of
   c) sulfuric acid in a concentration (based on $H_2O$) in the mixture to be treated of from about 40 to about 75 wt. %, and d) an at least equimolar (based on nitrate) amount of ammonium ion or an ammonium salt at a temperature which is maintained above 65° C. and below boiling temperature.

2. The process of claim 1 in which the mixture to be treated contains from 0.1 to 20 wt. % nitrate.

3. The process of claim 1 in which the treatment process is carried out continuously.

4. The process of claim 1 in which the $SO_2$ gas is blown through a reactor containing the solution to be treated.

5. The process of claim 1 in which the $SO_2$ gas is blown through a base of a reactor containing the solution to be treated.

6. The process of claim 1 in which reactor waste gases are brought into contact in a preliminary reactor countercurrently with incoming solution to be treated.

7. The process of claim 6 in which sulfamic acid and/or carbamic acid and/or urea is added to the incoming solution in an amount such that the solution to be treated contains at total of from 0.01 to 5 wt. % of sulfamic acid, carbamic acid or urea.

8. The process of claim 1 in which the solution containing nitrates and/or organic or inorganic nitrogen compounds to be treated is nitrate-containing waste water.

9. The process of claim 1 in which the solution containing nitrates and/or organic or inorganic nitrogen compounds to be treated is wastewater formed in the production of caprolactams.

* * * * *